United States Patent
Tamura et al.

(10) Patent No.: US 11,473,800 B2
(45) Date of Patent: Oct. 18, 2022

(54) DEVICE MANAGEMENT SYSTEM

(71) Applicant: Mitsubishi Electric Corporation, Tokyo (JP)

(72) Inventors: Yuki Tamura, Tokyo (JP); Shuhei Koyama, Tokyo (JP); Fumihiko Ishizono, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 168 days.

(21) Appl. No.: 17/049,211

(22) PCT Filed: Jun. 14, 2018

(86) PCT No.: PCT/JP2018/022765
§ 371 (c)(1),
(2) Date: Oct. 20, 2020

(87) PCT Pub. No.: WO2019/239549
PCT Pub. Date: Dec. 19, 2019

(65) Prior Publication Data
US 2021/0239342 A1 Aug. 5, 2021

(51) Int. Cl.
*F24F 11/38* (2018.01)
*F25B 49/02* (2006.01)
*F24F 11/52* (2018.01)

(52) U.S. Cl.
CPC ........... *F24F 11/38* (2018.01); *F25B 49/022* (2013.01); *F24F 11/52* (2018.01)

(58) Field of Classification Search
CPC ......... F24F 11/38; F24F 11/52; F25B 49/022; F25B 49/005; F25B 2500/13;
(Continued)

(56) References Cited

U.S. PATENT DOCUMENTS

| | | | |
|---|---|---|---|
| 6,408,258 B1 * | 6/2002 | Richer | G06Q 10/06 702/182 |
| 2003/0005710 A1 * | 1/2003 | Singh | A23L 3/00 236/51 |

(Continued)

FOREIGN PATENT DOCUMENTS

| EP | 3 522 352 A1 | 8/2019 |
|---|---|---|
| JP | H03-233269 A | 10/1991 |

(Continued)

OTHER PUBLICATIONS

International Search Report of the International Searching Authority dated Sep. 18, 2018 for the corresponding international application No. PCT/JP2018/022765 (and English translation).

(Continued)

*Primary Examiner* — Adnan Aziz
(74) *Attorney, Agent, or Firm* — Posz Law Group, PLC

(57) ABSTRACT

A device management system having a device having a structural component and a terminal connected to the device via a network includes a feature value detection unit provided in the device and for detecting a feature value of the structural component, a storage device storing in time series the feature value detected by the feature value detection unit, a lifespan estimation unit for estimating a lifespan of the structural component from the feature value stored in the storage device, a determination unit for determining whether a remaining period that is a time period from a time at which estimation is performed to an end of the lifespan is less than or equal to a set scheduled period, and a notification unit provided in the terminal and for sending a notification indicating that the remaining period is less than or equal to the set scheduled period.

11 Claims, 12 Drawing Sheets

(58) Field of Classification Search
CPC .............. F25B 2700/03; F25B 2700/151; F25B 49/02; F04B 51/00; G06Q 10/00; G06Q 10/06; G08B 23/00; G05B 23/0283; G05B 23/0286; G05B 19/418
See application file for complete search history.

(56) References Cited

U.S. PATENT DOCUMENTS

| | | | |
|---|---|---|---|
| 2003/0055534 A1 | 3/2003 | Saito et al. | |
| 2003/0216888 A1* | 11/2003 | Ridolfo | G05B 23/0283 702/181 |
| 2007/0089435 A1* | 4/2007 | Singh | F25B 49/005 62/157 |
| 2018/0073389 A1* | 3/2018 | Zhang | F01D 21/003 |
| 2018/0224148 A1* | 8/2018 | Jung | F24F 11/52 |
| 2019/0197794 A1* | 6/2019 | Carpenter | F02M 35/0208 |
| 2019/0242375 A1 | 8/2019 | Nakamura | |

FOREIGN PATENT DOCUMENTS

| | | |
|---|---|---|
| JP | H10-288379 A | 10/1998 |
| JP | H10-288431 A | 10/1998 |
| JP | 2002-222011 A | 8/2002 |
| JP | 2003-091313 A | 3/2003 |
| JP | 2004-340549 A | 12/2004 |
| JP | 2006-318357 A | 11/2006 |
| JP | 2008-050965 A | 3/2008 |
| JP | 2010-025439 A | 2/2010 |
| JP | 2013-212000 A | 10/2013 |
| JP | 2014-010685 A | 1/2014 |
| JP | 2015-148394 A | 8/2015 |
| JP | 2017-083060 A | 5/2017 |
| JP | 2017-141991 A | 8/2017 |
| WO | 2018/061287 A1 | 4/2018 |
| WO | 2018/078853 A1 | 5/2018 |

OTHER PUBLICATIONS

Office Action dated Jun. 28, 2022 issued in corresponding JP patent application No. 2020-525034 (and English translation).

* cited by examiner

Comparative Example

DEVICE MANAGEMENT SYSTEM

CROSS REFERENCE TO RELATED APPLICATIONS

This application is a U.S. national stage application of International Application No. PCT/JP2018/022765 filed on Jun. 14, 2018, the contents of which are incorporated herein by reference.

TECHNICAL FIELD

The present disclosure relates to a device management system that manages a structural component.

BACKGROUND ART

As an example of a related-art air-conditioning apparatus, there has been proposed an air-conditioning apparatus that determines the presence or absence of an abnormality with a compressor and stops the compressor when it is determined that there is an abnormality with the compressor (see, for example, Patent Literature 1).

In a case where an air-conditioning apparatus abnormally stops, the user will contact a maintenance company. When the maintenance company receives a notification from the user, a worker visits the installation site of the abnormally stopped air-conditioning apparatus and investigates the cause of the abnormality. When the investigation shows that the abnormality was caused by the compressor, the worker checks whether the compressor is in stock in the warehouse of the maintenance company.

In this way, when the maintenance company receives a notification of a product failure from the user, a worker investigates the actual device. In a case where the compressor is suspected to have failed, the worker transports a replacement compressor stored in, for example, the warehouse of the company to the user and replaces the compressor with the replacement compressor. Such a handling method is called request-based handling because it is handled after a notification is received.

CITATION LIST

Patent Literature

Patent Literature 1: Japanese Unexamined Patent Application Publication No. 2017-83060

Summary of Invention

Technical Problem

The air-conditioning apparatus of Patent Literature 1 stops operating for a period of time from when an abnormality occurs in the compressor to when replacement of the compressor is completed. For example, in a case where the air-conditioning apparatus is a refrigerating machine, the products in a freezer may deteriorate when the shutdown period from when the compressor stops to when the replacement compressor starts up is long.

The present disclosure has been made to solve problems as described above, and provides a device management system that reduces a device shutdown period.

Solution to Problem

A device management system according to an embodiment of the present disclosure has a device having a structural component and a terminal connected to the device via a network, and the device management system includes a feature value detection unit provided in the device and configured to detect a feature value of the structural component, a storage device storing in time series the feature value detected by the feature value detection unit, a lifespan estimation unit configured to estimate a lifespan of the structural component from the feature value stored in the storage device, a determination unit configured to determine whether a remaining period that is a time period from a time at which estimation is performed to an end of the lifespan is less than or equal to a set scheduled period, and a notification unit provided in the terminal and for sending a notification indicating that the remaining period is less than or equal to the set scheduled period.

Advantageous Effects of Invention

According to an embodiment of the present disclosure, when it is determined that the remaining period is less than or equal to the scheduled period, the determination result is reported to the terminal, and thus if preparations for replacement of the structural component are made, the structural component can be systematically replaced before the structural component abnormally stops. Thus, the shutdown period of the device may be prevented from prolonging due to a failure of the structural component.

DESCRIPTION OF EMBODIMENTS

Embodiment 1

Figure 1:
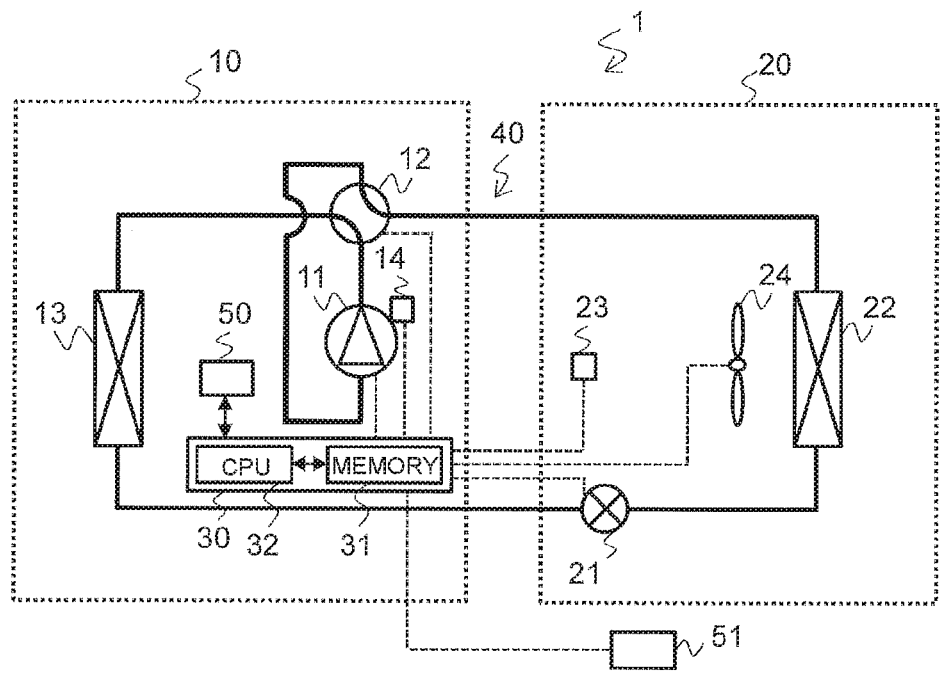
FIG. 1 is a diagram illustrating an example of the configuration of a refrigeration cycle system according to Embodiment 1 of the present disclosure.

The configuration of a refrigeration cycle system of Embodiment 1 will be described. FIG. 1 is a diagram illustrating an example of the configuration of the refrigeration cycle system according to Embodiment 1 of the present disclosure. A refrigeration cycle system 1 has a heat source side unit 10 including a compressor 11, a four-way valve 12, and a heat source side heat exchanger 13, and a load side unit 20 including an expansion device 21 and a load side heat exchanger 22. A refrigerant circuit 40 is so configured that the compressor 11, the heat source side heat exchanger 13, the expansion device 21, and the load side heat exchanger 22 are connected by a refrigerant pipe, and refrigerant circulates. In Embodiment 1, the case where a device for which failure estimation is to be performed is the heat source side unit 10 will be described; however, it can be applied to any device connected to the network.

The heat source side unit 10 has a feature value detection unit 14, a controller 30, and a storage device 50. The feature value detection unit 14 detects a feature value of the compressor 11. A display device 51 is connected to the controller 30. The load side unit 20 has a room temperature sensor 23 and a fan 24. The room temperature sensor 23 detects the temperature of the inside of a room that is an air-conditioned space. The display device 51 functions as a notification unit that notifies the user of information. The notification unit may be an output unit capable of performing not only display output but also one or both of display output and audio output.

The compressor 11 is, for example, an inverter-type variable capacity compressor. The four-way valve 12 switches the flow path of refrigerant in accordance with the operation state. In a case where the operation state is a cooling operation, the four-way valve 12 switches the flow path so that the refrigerant discharged from the compressor 11 flows into the heat source side heat exchanger 13. In a case where the operation state is a heating operation, the four-way valve 12 switches the flow path so that the refrigerant discharged from the compressor 11 flows into the load side heat exchanger 22. The heat source side heat exchanger 13 is a heat exchanger that exchanges heat between refrigerant and outside air. The expansion device 21 is a device that expands refrigerant. The expansion device 21 is, for example, an electronic expansion valve. The load side heat exchanger 22 is a heat exchanger that exchanges heat between refrigerant and indoor air. The fan 24 sucks air from the room and supplies the air to the load side heat exchanger 22.

Figure 2:
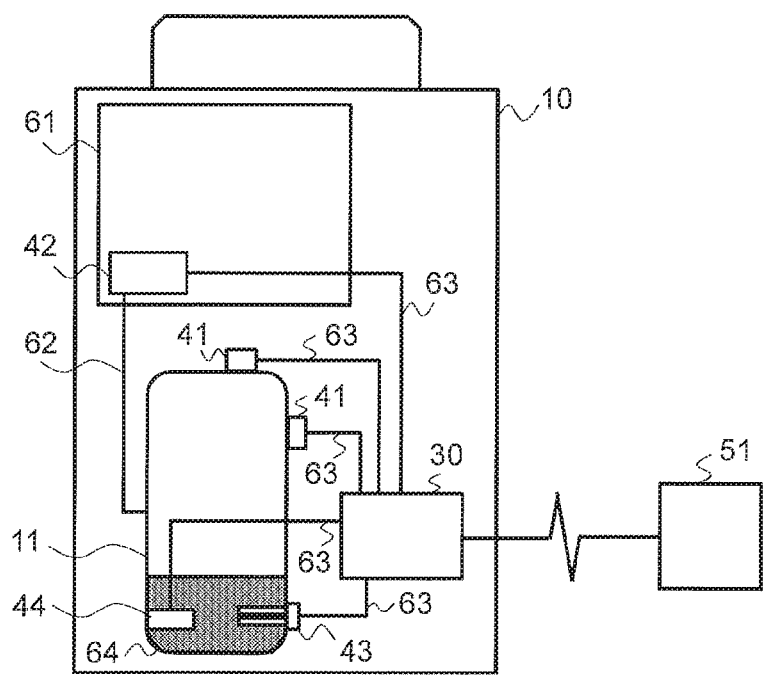
FIG. 2 is a schematic perspective view illustrating an example of the configuration of an outdoor unit illustrated in FIG. 1.

FIG. 2 is a schematic perspective view illustrating an example of the configuration of an outdoor unit illustrated in FIG. 1. In Embodiment 1, as illustrated in FIG. 2, vibration meters 41, an electric current sensor 42, a capacitance sensor 43, and a photometric sensor 44 are provided as feature value detection units 14. In Embodiment 1, the case where there are a plurality of types of feature value detection units 14 will be described; however, it suffices that at least one feature value detection unit 14 be provided.

The heat source side unit 10 has a motor controller 61 equipped with an inverter that controls the rotation speed of the motor of the compressor 11 in accordance with a command from the controller 30. The motor controller 61 supplies power to the motor of the compressor 11 via a power line 62. The electric current sensor 42 is provided in the motor controller 61. The electric current sensor 42 detects an increase, an imbalance, and a phase imbalance in an operation current fed back to the inverter, and outputs a detection result to the controller 30 via a signal line 63. When the compressor 11 deteriorates from the normal state, the detection value from the electric current sensor 42 increases or the imbalance or phase imbalance of the detection value increases.

The vibration meters 41 are attached to the main body of the compressor 11. The vibration meters 41 detect vibration of the compressor 11 and output the frequency of the detected vibration. When the compressor 11 deteriorates from the normal state, the detection values from the vibration meters 41 increase.

The capacitance sensor 43 and the photometric sensor 44 are installed at positions immersed in refrigerating machine oil 64 of the compressor 11, and detect the state of the refrigerating machine oil 64. The capacitance sensor 43 detects the capacitance of the refrigerating machine oil 64, and detects a change in the physical properties of the refrigerating machine oil 64. The photometric sensor 44 has a light emitting unit and a light receiving unit, which are not illustrated, detects the light transmittance of the refrigerating machine oil 64 between the light emitting unit and the light receiving unit, and detects a change in the color tone of the refrigerating machine oil 64.

The capacitance and light transmittance of the refrigerating machine oil 64 do not directly represent the state of the compressor 11; however, the capacitance and light transmittance of the refrigerating machine oil 64 serve as feature values that indirectly represent the state of the compressor 11. The greater the compressor 11 deteriorates from the normal state, the more likely the detection value from the capacitance sensor 43 increases. The greater the compressor 11 deteriorates from the normal state, the more likely the detection value from the photometric sensor 44 decreases. The frequency of the vibration of the compressor 11, the operation current fed back to the inverter, and the capacitance and light transmittance of the refrigerating machine oil 64 correspond to operation data of the compressor 11, which represents feature values of the compressor 11.

Figure 3:
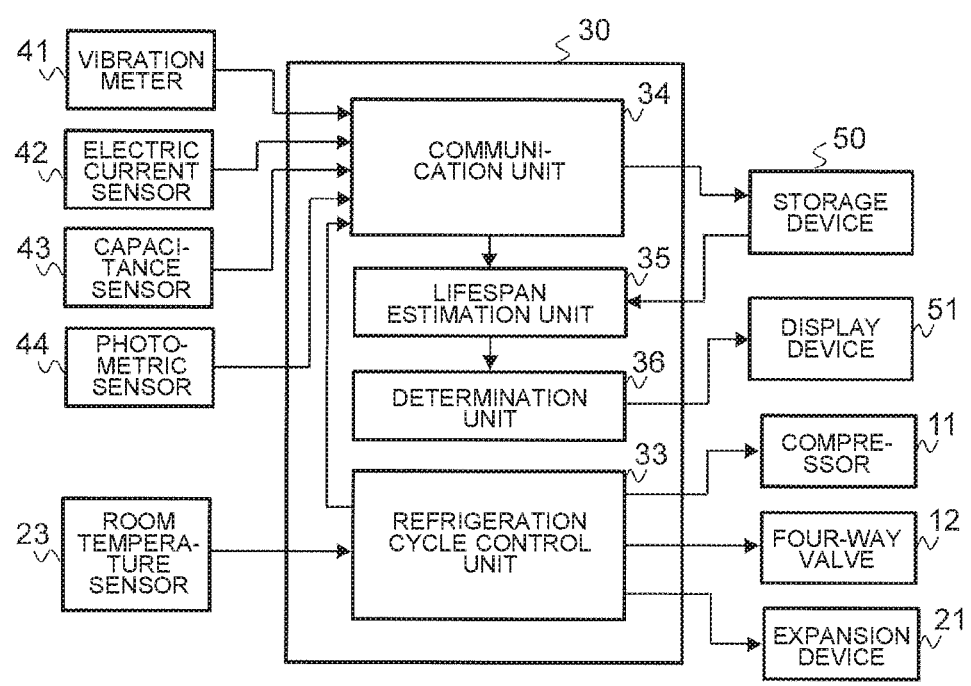
FIG. 3 is a functional block diagram illustrating an example of the configuration of a controller illustrated in FIG. 1.

FIG. 3 is a functional block diagram illustrating an example of the configuration of the controller illustrated in FIG. 1. The controller 30 estimates, from feature values of the compressor 11, the lifespan of the compressor 11 that lasts until a failure occurs in the compressor 11. As illustrated in FIG. 1, the controller 30 has a memory 31, in which programs are stored, and a central processing unit (CPU) 32, which executes processing in accordance with the programs. The memory 31 stores operation data acquisition conditions that are conditions for acquiring operation data for determining the state of the compressor 11, and a cycle T1, which indicates a timing at which the operation data is acquired. The storage device 50 stores, in time series, a feature value detected by each feature value detection unit 14.

The controller 30 has a refrigeration cycle control unit 33, a communication unit 34, a lifespan estimation unit 35, and a determination unit 36. Through execution of programs using the CPU 32, the refrigeration cycle control unit 33, the communication unit 34, the lifespan estimation unit 35, and the determination unit 36 are configured in the refrigeration cycle system 1.

The refrigeration cycle control unit 33 controls the refrigeration cycle of the refrigerant circuit 40, so that the detection value from the room temperature sensor 23 is turned to be a set temperature. The refrigeration cycle control unit 33 performs an operation data acquisition operation in which the rotation speed of the compressor 11 and the opening degree of the expansion device 21 are controlled in accordance with the operation data acquisition conditions in the cycle T1 to circulate refrigerant in the refrigerant circuit 40. The cycle T1 is, for example, 24 hours. Note that, in a case where the load of the refrigeration cycle is still high even at the timing at which operation data is acquired, the refrigeration cycle control unit 33 may perform the operation data acquisition operation after the load of the refrigeration cycle becomes low. The case where the load of the refrigeration cycle becomes low is, for example, a case where the room temperature is within a set temperature range based on the set temperature and the thermostat is turned off. When starting the operation data acquisition operation, the refrigeration cycle control unit 33 notifies the communication unit 34 of operation information indicating that the operation data acquisition operation is in progress.

Upon receiving the operation information from the refrigeration cycle control unit 33, the communication unit 34 acquires feature values from the feature value detection units 14 and stores the feature values in the storage device 50. The lifespan estimation unit 35 estimates the lifespan of the compressor 11 from a plurality of feature values stored in the storage device 50. The lifespan estimation unit 35 may perform lifespan estimation through absolute evaluation or relative evaluation. Absolute evaluation is evaluation of a feature value stored in the storage device 50 by comparing the feature value with a set threshold. Relative evaluation is evaluation performed using a plurality of feature values stored in time series in the storage device 50. The determination unit 36 compares a remaining period PTer, which is a period from the time of the estimation performed by the lifespan estimation unit 35 to the end of the lifespan estimated by the lifespan estimation unit 35, with a set scheduled period RTer. When the remaining period PTer is less than or equal to the scheduled period RTer, the determination unit 36 causes the display device 51 to display that the scheduled period RTer has been reached.

The scheduled period RTer is, for example, a period during which it is expected that the heat source side unit 10 can be systematically stopped and the compressor 11 can be replaced while suppressing disruption due to operation stoppage of the refrigeration cycle system 1. The scheduled period RTer differs depending on the purpose of use of the compressor 11 at the users site and the type of the compressor 11. For example, in a case where the heat source side unit 10 is used for a refrigerating machine, the scheduled period RTer is set to be longer than in a case where the heat source side unit 10 is used for indoor air-conditioning. This is because stopping the refrigerating machine greatly affects the stored items. The scheduled period RTer is also set to be longer than the lead time from placing an order for the compressor 11 to supplying the order. This is because the refrigeration cycle system 1 cannot be systematically stopped if the compressor in use fails before the manufacturing of a compressor is completed.

Note that, for example, the heat source side heat exchanger 13 and the load side heat exchanger 22 may be provided with a plurality of temperature sensors for detecting the temperature of refrigerant. In this case, the refrigeration cycle control unit 33 may control the degree of superheat and the degree of subcooling using detection values from these temperature sensors. In addition, as illustrated in FIG. 1, Embodiment 1 describes a case where the heat source side unit 10 is provided with the four-way valve 12; however, the four-way valve 12 does not have to be provided. Furthermore, a bypass for a defrosting operation may be provided in the refrigeration cycle system 1.

Figure 4:
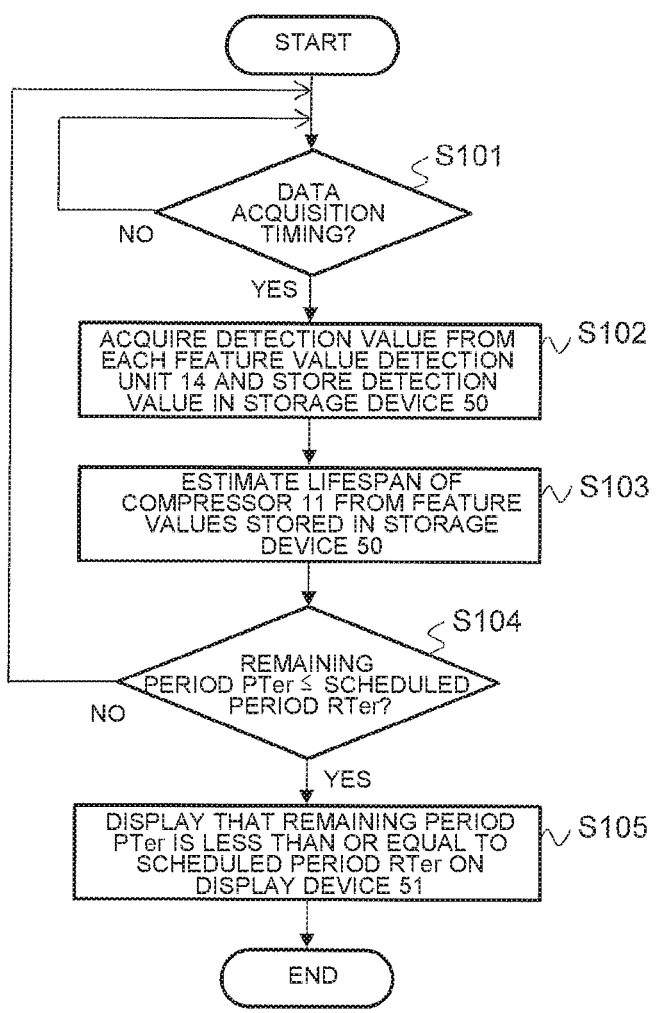
FIG. 4 is a flowchart illustrating an operating procedure for the refrigeration cycle system illustrated in FIG. 1.

Next, the operation of the refrigeration cycle system of Embodiment 1 will be described. FIG. 4 is a flowchart illustrating an operating procedure for the refrigeration cycle system illustrated in FIG. 1.

The communication unit 34 determines whether a data acquisition timing has arrived, on the basis of whether notification of the operation information is received from the refrigeration cycle control unit 33 (step S101). When the communication unit 34 is notified of the operation information, the communication unit 34 acquires detection values from the vibration meters 41, the electric current sensor 42, the capacitance sensor 43, and the photometric sensor 44 and stores the detection values in the storage device 50 (step S102). When receiving the plurality of detection values as feature values of the compressor 11 from the communication unit 34, the storage device 50 stores the plurality of detection values together with information indicating the reception time. The lifespan estimation unit 35 estimates the lifespan of the compressor 11 from a plurality of feature values stored in the storage device 50 at a set timing (step S103). In this case, a case where the feature values are vibration values of the compressor 11 will be described.

In a case where lifespan estimation is performed through absolute evaluation, the lifespan estimation unit 35 compares the latest vibration value among the plurality of vibration values stored in the storage device 50 with a set threshold. The threshold is stored in the memory 31. As a result of the comparison, in a case where the vibration value is greater than or equal to the threshold, the lifespan estimation unit 35 notifies the determination unit 36 that the remaining period PTer has reached the scheduled period RTer. In a case where the vibration value is less than the threshold, the lifespan estimation unit 35 notifies the determination unit 36 that the remaining period PTer has not yet reached the scheduled period RTer. The threshold serving as a reference for lifespan determination may be set by the user, or may be set in accordance with the specifications such as the lead time that differs depending on the type of the compressor 11. For example, in a case where the lead time from placing an order for the compressor 11 provided in the heat source side unit 10 to supplying the order is long, it takes time to secure a replacement compressor 11, and thus the threshold for the vibration value is set to a value lower than an average value.

In addition, in a case where lifespan estimation is performed through relative evaluation, the lifespan estimation unit 35 uses a plurality of vibration values stored in the storage device 50 and calculates the rate of change using two vibration values whose detection dates are separated by a certain period of time. The certain period of time is, for example, a day or a week. Then, from the calculated rate of change, the lifespan estimation unit 35 calculates the remaining period PTer, which is a period lasting until the vibration value of the compressor 11 becomes a vibration value for which it is determined that the compressor 11 has reached the end of its lifespan.

The determination unit 36 performs lifespan determination to determine whether the remaining period PTer, which is a period from the time of the estimation performed by the lifespan estimation unit 35 to the end of the lifespan, is less than or equal to the scheduled period RTer (step S104). In a case where the remaining period PTer is less than or equal to the scheduled period RTer, the determination unit 36 causes the display device 51 to display that the remaining period PTer is less than or equal to the scheduled period RTer (step S105). The determination unit 36 may cause the display device 51 to output an alarm. In a case where the remaining period PTer is longer than the scheduled period RTer, the determination unit 36 causes the process to return to step S101.

In the refrigeration cycle system 1 of Embodiment 1, the display device 51 outputs an alarm when the remaining period PTer of the compressor 11 is less than or equal to the scheduled period RTer. An information processing terminal 81 causes the display device 51 to display, for example, a message that "the lifespan is less than 3 months" as an alarm output. The user notifies a maintenance company that the display device 51 has output an alarm. Upon receiving, from the user, a notification that the system has output an alarm, a worker of the maintenance company arranges for a replacement compressor and coordinates a replacement work plan for the compressor with the user.

In this manner, the user of the system can systematically replace the compressor before the compressor stops due to failure. Consequently, the user can reduce the shutdown period of the system due to a failure of the compressor, and the maintenance company can reduce the number of compressors corresponding to the compressor to be serviced that are in stock.

Note that the lifespan determination in step S103 may be performed through either one or both of the absolute evaluation and the relative evaluation. In a case where the lifespan estimation unit 35 performs a determination through both the absolute evaluation and the relative evaluation, the determination unit 36 may cause the display device 51 to output an alarm in a case where it is determined that the remaining period PTer the scheduled period RTer through at least one of the absolute evaluation and the relative evaluation. In this case, the user can be more assuredly prompted to replace the compressor 11 before a failure of the compressor 11 occurs. Furthermore, when the compressor 11 can no longer operate normally, there will be a loss of power supplied. Thus, the lifespan estimation unit 35 may calculate the amount of power consumption of the compressor 11 from a change in the feature values and cause the display device 51 to display the calculated amount of power consumption.

In the procedure described with reference to FIG. 4, the case where the feature value detection units 14 are the vibration meters 41 has been described; however, the feature value detection units 14 may be sensors other than the vibration meters 41 among the vibration meters 41, the electric current sensor 42, the capacitance sensor 43, and the photometric sensor 44. Furthermore, the lifespan estimation unit 35 may perform lifespan estimation by using detection values from two or more feature value detection units 14 among these four feature value detection units 14. In a case where the results of lifespan estimation based on the detection values from the two or more feature value detection units 14 differ from each other, the two or more feature value detection units 14 may be prioritized. Furthermore, in a case where the results of lifespan estimation based on detection values from three or more feature value detection units 14 differ from each other, the lifespan estimation unit 35 may determine lifespan estimation based on majority rule.

Figure 5:
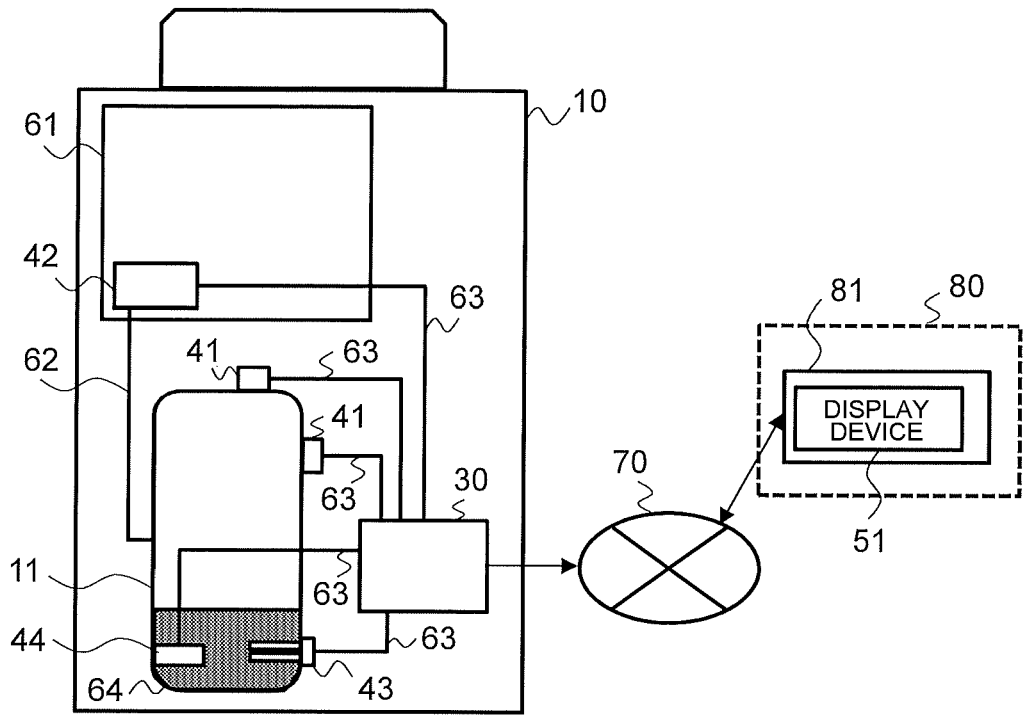
FIG. 5 is a diagram illustrating an example of the configuration of a device management system including the refrigeration cycle system according to Embodiment 1 of the present disclosure.

In addition, in Embodiment 1, the case where the controller 30 outputs an alarm indicating that the compressor 11 is near the end of its lifespan has been described; however, the result of the lifespan determination in step S104 may be reported to an information processing terminal of the maintenance company. FIG. 5 is a diagram illustrating an example of the configuration of a device management system including the refrigeration cycle system according to Embodiment 1 of the present disclosure.

As illustrated in FIG. 5, the device management system has the refrigeration cycle system 1 and the information processing terminal 81. The information processing terminal 81 is managed by, for example, a maintenance company 80. The controller 30 is connected to the information processing terminal 81 via a network 70. The information processing terminal 81 is, for example, a personal computer (PC) provided with the display device 51. The information processing terminal 81 may be a mobile terminal such as a smartphone. The network 70 is, for example, the Internet. In a case where the network 70 is the Internet, the determination unit 36 and the information processing terminal 81 communicate with each other using the Internet Protocol (IP) as a common communication protocol.

In the lifespan determination performed in step S104 illustrated in FIG. 4, in a case where the determination unit 36 determines that the remaining period PTer is less than or equal to the scheduled period RTer, the determination unit 36 transmits, to the information processing terminal 81, end-of-lifespan-approaching information indicating that the remaining period PTer is less than or equal to the scheduled period RTer. In this case, the determination unit 36 may include, in the end-of-lifespan-approaching information, information on a device identifier for uniquely identifying the heat source side unit 10. Device identification information is stored in the memory 31.

In this case, when the remaining period PTer of the compressor 11 is less than or equal to the scheduled period RTer, the end-of-lifespan-approaching information is reported to the information processing terminal 81 of the maintenance company 80. This allows a worker of the maintenance company 80 to know that the compressor 11 of the user is nearing the end of its lifespan. In this case, the user does not have to notify the maintenance company 80 by themselves that the compressor 11 is nearing the end of its lifespan. For the user, not only the burden of notification of the end-of-lifespan-approaching information is reduced but also the end-of-lifespan-approaching information can be prevented from not being reported to the maintenance company 80.

Figure 6:
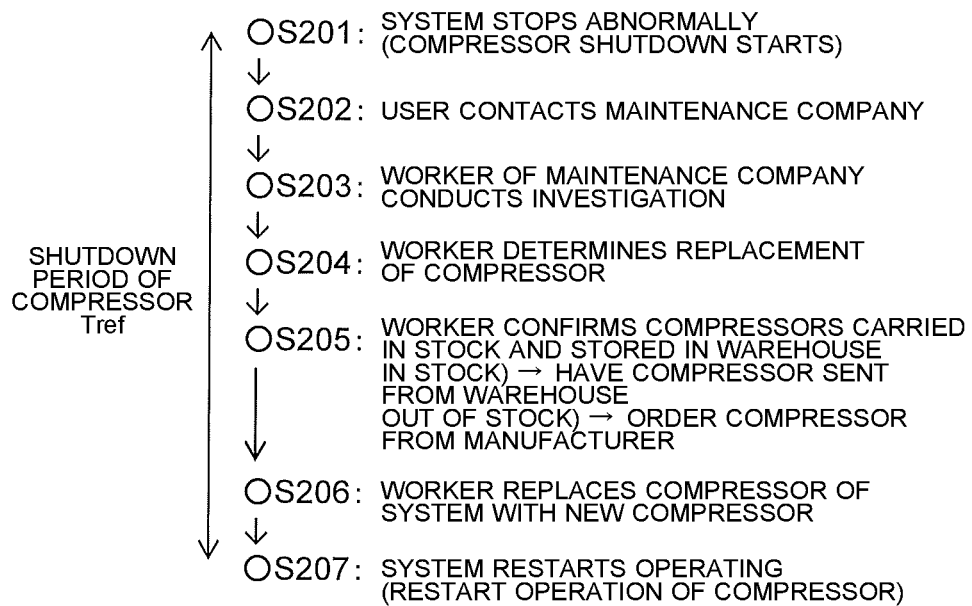
FIG. 6 is a diagram illustrating the procedure for replacement work for a compressor in a comparative example.
Figure 7:
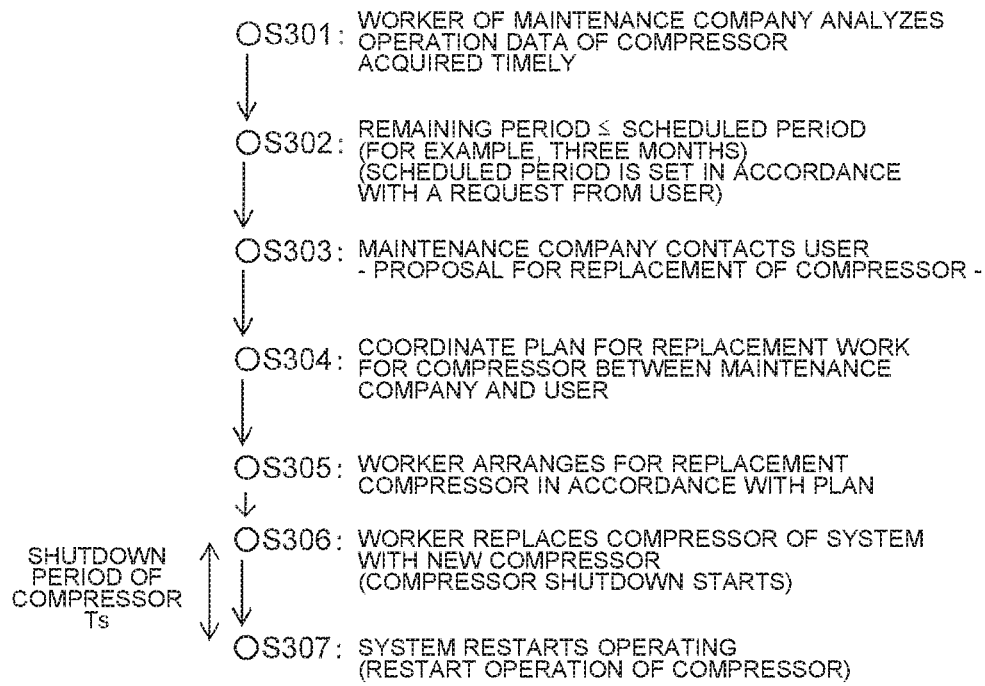
FIG. 7 is a diagram illustrating the procedure for replacement work for a compressor in the device management system including the refrigeration cycle system according to Embodiment 1 of the present disclosure.

Next, the shutdown period regarding replacement work for the compressor in the configuration of the device management system of Embodiment 1 illustrated in FIG. 5 will be described in comparison with a comparative example. FIG. 6 is a diagram illustrating the procedure for replacement work for the compressor in the comparative example. FIG. 7 is a diagram illustrating the procedure for replacement work for the compressor in the device management system including the refrigeration cycle system according to Embodiment 1 of the present disclosure.

As illustrated in FIG. 6, in the comparative example, the shutdown period of the compressor starts when the compressor fails (step S201). When the refrigeration cycle system stops operating, the user contacts the maintenance company (step S202). A worker of the maintenance company goes to the installation site of the system, and investigates the cause of stoppage of the compressor (step S203). In a case where the worker determines that the compressor needs to be replaced (step S204), the worker confirms whether the compressor is in stock in the warehouse (step S205). Here, in a case where the compressor is out of stock in the warehouse, the worker needs to order the compressor from the manufacturer of the compressor.

When a replacement compressor is ready, the worker of the maintenance company goes to the installation site of the refrigeration cycle system again, and replaces the failed compressor with the new compressor (step S206). Thereafter, the compressor restarts operating, and the refrigeration cycle system restarts operating (step S207). In FIG. 6, the shutdown period of the compressor is denoted as Tref.

In contrast, in the configuration illustrated in FIG. 5, when the controller 30 transmits the operation data of the compressor 11 to the information processing terminal 81 of the maintenance company 80 every time the operation data of the compressor 11 is acquired, the information processing terminal 81 can timely acquire the operation data of the compressor 11 (step S301). A worker of the maintenance company 80 can also analyze the operation data of the compressor 11 by operating the information processing terminal 81. When receiving, from the controller 30, the end-of-lifespan-approaching information indicating that the remaining period PTer the scheduled period RTer (step S302), the information processing terminal 81 outputs an alarm. The scheduled period RTer is, for example, three months.

Since the compressor 11 has about three months until the time when the end of its lifespan is reached and a failure occurs, the worker of the maintenance company 80 contacts the user to propose replacement of the compressor 11 (step S303). The worker of the maintenance company 80 and the user plan and coordinate replacement work for the compressor 11 (step S304), Thereafter, the worker arranges for a replacement compressor so that the replacement compressor is ready in time for the replacement work according to the plan (step S305). When the replacement compressor is ready, the worker of the maintenance company goes to the installation site of the refrigeration cycle system 1, stops the operation of the refrigeration cycle system 1, and replaces the compressor with the new compressor (step S306). When the replacement work for the compressor is completed, the worker starts up the compressor 11 to restart the operation of the refrigeration cycle system 1 (step S307).

In FIG. 7, the shutdown period of the compressor is denoted as Ts. A comparison between the shutdown period Trer of the comparative example illustrated in FIG. 6 and the shutdown period Ts illustrated in FIG. 7 shows that the shutdown period Ts is extremely shorter than the shutdown period Tref.

Figure 8:
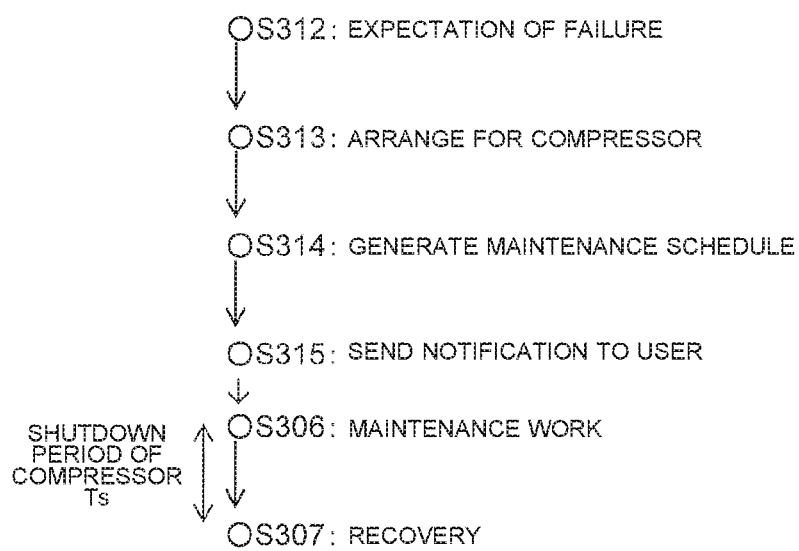
FIG. 8 is a diagram illustrating the procedure for replacement work for the compressor in a case where a part of the procedure illustrated in FIG. 7 is automated.

It is also conceivable that a part of the procedure illustrated in FIG. 7 is automated by an information processing device. FIG. 8 is a diagram illustrating the procedure for replacement work for the compressor in a case where a part of the procedure illustrated in FIG. 7 is automated. The controller 30 analyzes the operation data of the compressor 11. In a case where the controller 30 determines that the remaining period is less than or equal to the set scheduled period, the controller 30 reports the determination result to an information processing terminal of a compressor manufacturer (step S312). At the compressor manufacturer, an employee of the manufacturer arranges for production of the compressor 11 (step S313). The information processing terminal of the compressor manufacturer updates production planning information by, for example, bringing forward the production planning of the compressor 11, The information processing terminal of the compressor manufacturer reports the updated production planning information to the information processing terminal 81 of the maintenance company 80. The information processing terminal 81 generates a maintenance schedule for systematic replacement of the compressor 11 in accordance with the reported production planning information (step S314). After updating the production planning information, the information processing terminal of the compressor manufacturer transmits the updated production planning information to the communication unit 34 to cause the display device 51 of the controller 30 to output the updated production planning information (step S315). In step S315, the information processing terminal 81 may transmit the generated maintenance schedule to the controller 30. The display device 51 displays the production planning and the maintenance schedule. In this manner, the part of the procedure is processed by the terminals, thereby reducing the burden on persons such as the administrator. In addition, the user can look at the production planning and maintenance schedule of the compressor 11 and prepare to systematically stop the refrigeration cycle system 1.

Figure 9:
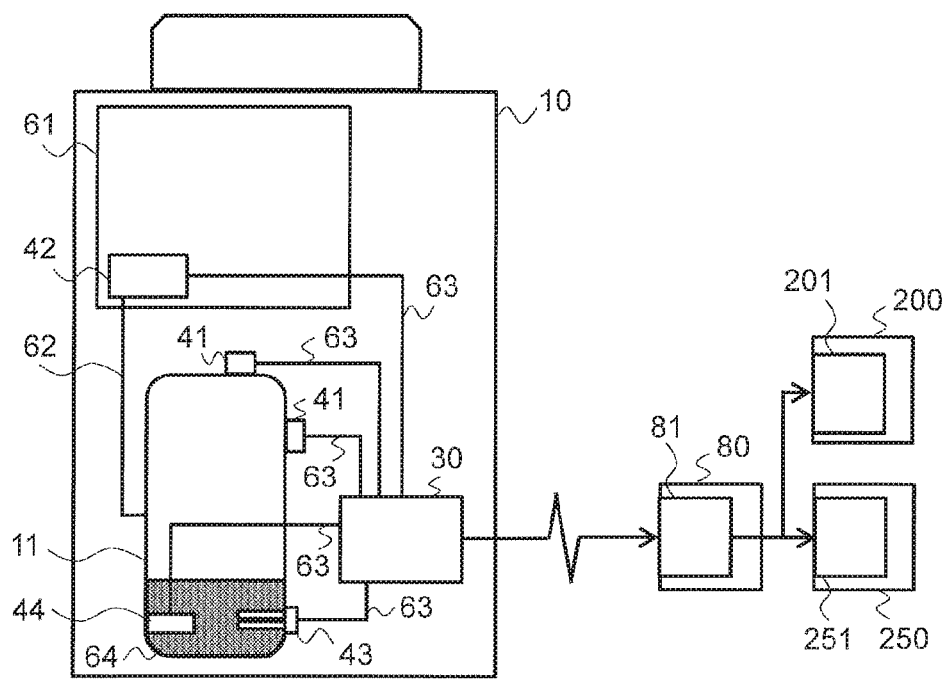
FIG. 9 is a diagram illustrating another example of a notification destination of end-of-lifespan-approaching information in the refrigeration cycle system according to Embodiment 1 of the present disclosure.

With reference to FIG. 5, the case where the controller 30 reports the end-of-lifespan-approaching information to the information processing terminal 81 of the maintenance company 80 has been described; however, the notification destination of the information regarding lifespan determination is not limited to the maintenance company 80. FIG. 9 is a diagram illustrating another example of the notification destination of the end-of-lifespan-approaching information in the refrigeration cycle system according to Embodiment 1 of the present disclosure.

As illustrated in FIG. 9, the controller 30 also transmits the lifespan determination result to an information processing terminal 201 of a warehouse 200 and an information processing terminal 251 of a compressor manufacturer 250 in addition to the information processing terminal 81 of the maintenance company 80. This lifespan determination result is not limited to the end-of-lifespan-approaching information, and may include information on the remaining period PTer calculated by the lifespan estimation unit 35. In addition, in FIG. 9, the case where a communication connection unit between the controller 30 and the information processing terminals 81, 201, and 251 is a signal line; however, the communication connection unit may be the network 70 illustrated in FIG. 5.

As illustrated in FIG. 9, in a case where the lifespan determination result is reported to the maintenance company 80, the warehouse 200, and the compressor manufacturer 250, a person in charge at each company can determine when a replacement compressor is prepared for the compressor 11. Thus, a worker of the maintenance company 80 does not need to contact the warehouse 200 and the compressor manufacturer 250 regarding the stock status and manufacturing plan of the compressor 11. Depending on the purpose of use of the lifespan determination result, one or more of the display device 51, the maintenance company 80, the warehouse 200, and the compressor manufacturer 250 may be set as the notification destination or destinations of the lifespan determination result. A worker of the maintenance company 80 can quickly and systematically replace the compressor on the basis of the lifespan determination result. The administrator of the warehouse 200 can systematically reduce the number of replacement compressors in stock on the basis of the lifespan determination result. The person in charge at the compressor manufacturer 250 can arrange a compressor manufacturing plan on the basis of the lifespan determination result such that the number of compressors in stock before shipment is minimized.

The refrigeration cycle system 1 of Embodiment 1 has the feature value detection units 14, which detect feature values of the compressor 11, the lifespan estimation unit 35, which estimates the lifespan of the compressor 11 from the feature values, and the determination unit 36, which determines whether the remaining period PTer is less than or equal to the scheduled period RTer.

According to Embodiment 1, when it is determined that the remaining period PTer is less than or equal to the scheduled period RTer, in a case where the user makes preparations for replacement of the compressor 11, the compressor 11 can be systematically replaced before the compressor 11 abnormally stops. Consequently, the shutdown period of the refrigeration cycle system 1 may be prevented from prolonging due to a failure of the compressor 11.

Conventionally, a maintenance company worker may replace the compressor even in a case where the cause of the abnormality is unknown even after the abnormally stopped air-conditioning apparatus is examined. This is because the compressor is replaced on the presumption that the cause of the abnormality lies in the compressor since the compressor is made sturdy to prevent refrigerant leakage and it is difficult for the worker to disassemble the compressor on site to examine the cause. However, in a case where the stoppage of the air-conditioning apparatus is not due to an abnormality of the compressor, the personnel costs and time for the replacement work for the compressor are wasted. In contrast to this, in the refrigeration cycle system 1 of Embodiment 1, a worker can systematically replace the compressor before an abnormality occurs in the compressor. Thus, the personnel costs and time for the replacement work for the compressor can be prevented from being wasted.

Furthermore, in a case where air-conditioning apparatuses to be maintained include not only those used domestically but also those used in foreign countries, the maintenance company always needs to have a large number of replacement compressors in stock in each country. In contrast to this, in the refrigeration cycle system 1 of Embodiment 1, a worker of the maintenance company can systematically replace the compressor before an abnormality occurs in the compressor. Therefore, the maintenance company does not need to prepare a large number of replacement compressors in preparation for a failure the time of occurrence of which is unknown, and can reduce the number of replacement compressors in stock.

In Embodiment 1, the feature value detection units 14 detect, as a feature value or feature values, at least one of the vibration of the compressor 11, the current fed back to the motor of the compressor 11, and the state of the refrigerating machine oil 64 of the compressor 11. This is because a sign of abnormality of the compressor 11 can be determined from various parameters. Furthermore, in a case where a sign of abnormality of the compressor 11 is determined by using two or more parameters among parameters that are the vibration and current of the compressor 11 and the state of the refrigerating machine oil 64, the accuracy of the determination improves.

In a case where the feature value is the state of the refrigerating machine oil 64, the feature value detection unit 14 may detect at least one of the capacitance of the refrigerating machine oil 64 and the light transmittance of the refrigerating machine oil 64. This is because the state of the refrigerating machine oil 64 can be determined from various parameters. Moreover, in a case where the state of the refrigerating machine oil 64 is determined using both the capacitance and the light transmittance, the accuracy of the state determination of the refrigerating machine oil 64 improves.

Moreover, in Embodiment 1, when the refrigeration cycle control unit 33 controls the rotation speed of the compressor 11 and the opening degree of the expansion device 21 in accordance with the operation data acquisition conditions to circulate refrigerant in the refrigerant circuit 40, the communication unit 34 may acquire a feature value from the feature value detection unit 14. When the refrigeration cycle system 1 performs, as a lifespan diagnosis mode, the operation data acquisition operation based on operation data acquisition conditions for grasping a change in the state of the compressor 11, a feature value is acquired. Thus, the inclusion of disturbance based on the difference between the different driving conditions in a feature value is suppressed, and the accuracy of the lifespan estimation improves.

In addition, in Embodiment 1, when performing lifespan estimation, the lifespan estimation unit 35 may perform absolute evaluation in which a feature value is compared with a threshold or may perform relative evaluation in which a plurality of feature values are used. Absolute evaluation is effective in a case where, for example, an abnormality has suddenly occurred in the compressor 11. Relative evaluation is effective in lifespan estimation performed in a case where, for example, the compressor 11 deteriorates with the passage of time.

Note that, in the refrigeration cycle system 1 and the device management system of Embodiment 1, the case where the structural component for which failure estimation is to be performed is the compressor 11 has been described; however, the structural component is not limited to the compressor 11. In Embodiment 1, the case where the device including the structural component is the heat source side unit 10 has been described; however, the device including the structural component is not limited to the heat source side unit 10 of the refrigeration cycle system 1. The structural component may be an element other than the compressor 11. The structural component for which failure estimation is to be performed may be an electric component such as an inverter, a refrigerant pipe, a motor, refrigerant, a refrigerating machine oil, a filter of an indoor unit, a fan, and a water pump such as a chiller.

The device management system of Embodiment 1 has a device having a structural component and a terminal connected to the device via a network. The device management system has the lifespan estimation unit 35, which estimates the lifespan of the structural component, the determination unit 36, which determines whether the remaining period is less than or equal to the set scheduled period, and the notification unit, which is provided in the terminal and sends a notification in a case where the remaining period is less than or equal to the set scheduled period.

According to Embodiment 1, when it is determined that the remaining period is less than or equal to the scheduled period, the determination result is reported to the terminal, and thus if preparations for replacement of the structural component are made, the structural component can be systematically replaced before the structural component abnormally stops. Thus, the shutdown period of the device may be prevented from becoming long due to a failure of the structural component.

Embodiment 2

Although Embodiment 1 shows a case where the heat source side unit itself has a data analysis function, Embodiment 2 shows a case where a central controller that controls a plurality of heat source side units has a data analysis function. In Embodiment 2, the configurations described in Embodiment 1 are denoted as the same reference numerals, and the detailed description thereof will be omitted.

Figure 10:
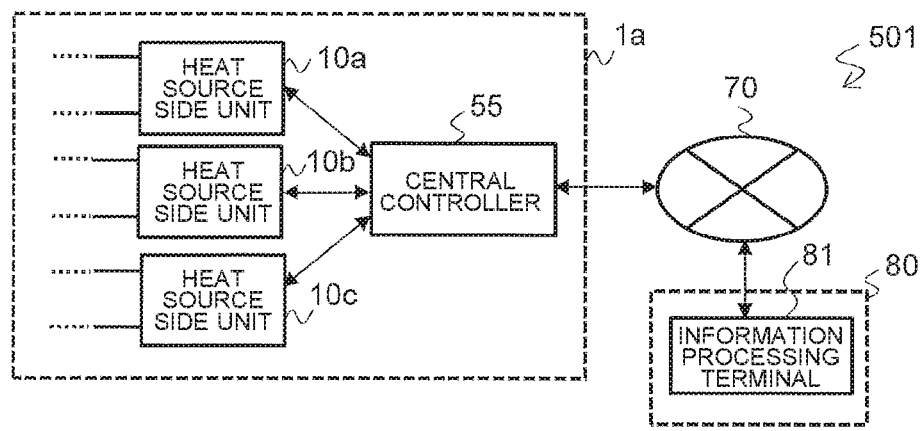
FIG. 10 is a diagram illustrating an example of the configuration of a device management system including a refrigeration cycle system according to Embodiment 2 of the present disclosure.

The configuration of a device management system including a refrigeration cycle system of Embodiment 2 will be described. FIG. 10 is a diagram illustrating an example of the configuration of the device management system including the refrigeration cycle system according to Embodiment 2 of the present disclosure. A device management system 501 has a refrigeration cycle system 1a and the information processing terminal 81. The refrigeration cycle system 1a of Embodiment 2 has a plurality of heat source side units 10a to 10c and a central controller 55 connected to the plurality of heat source side units 10a to 10c. The refrigeration cycle system 1a is provided, for example, in a building having a plurality of rooms. Although a load side unit is connected to each of the heat source side units 10a to 10c by a refrigerant pipe, an illustration of the load side units is omitted in FIG. 10.

The central controller 55 is connected to the network 70. The information processing terminal 81 provided in the maintenance company 80 is connected to the network 70. The information processing terminal 81 is, for example, a PC as described in Embodiment 1. The information processing terminal 81 has a storage unit and a control unit, which are not illustrated, in addition to the display device 51. The storage unit of the information processing terminal 81 stores, regarding the heat source side units 10a to 10c, user information corresponding to the device identifier of the compressor 11 of each heat source side unit. The user information includes the installation site of the refrigeration cycle system 1a and the user's contact information. Note that Embodiment 2 describes a case where the number of heat source side units is three; however, the number of heat source side units may be two or more, and is not limited to three.

Figure 11:
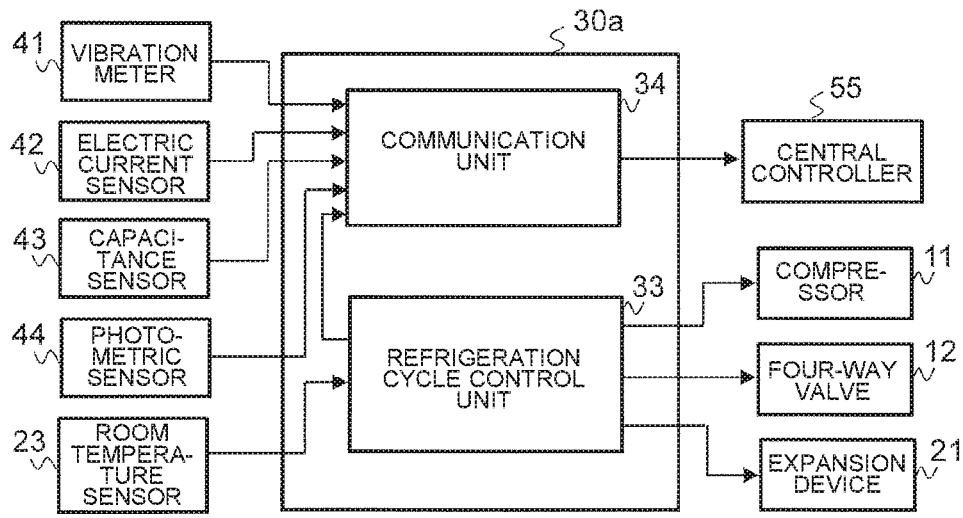
FIG. 11 is a functional block diagram illustrating an example of the configuration of a controller provided in a heat source side unit illustrated in FIG. 10.

FIG. 11 is a functional block diagram illustrating an example of the configuration of a controller provided in the heat source side unit illustrated in FIG. 10. A controller 30a has the communication unit 34 and the refrigeration cycle control unit 33. The communication unit 34 transmits a feature value acquired from each feature value detection unit 14 to the central controller 55. When transmitting the feature value, the communication unit 34 transmits the device identifier of the compressor 11 together with the feature value to the central controller 55. The device identifier of the compressor 11 is stored in the memory 31.

Figure 12:
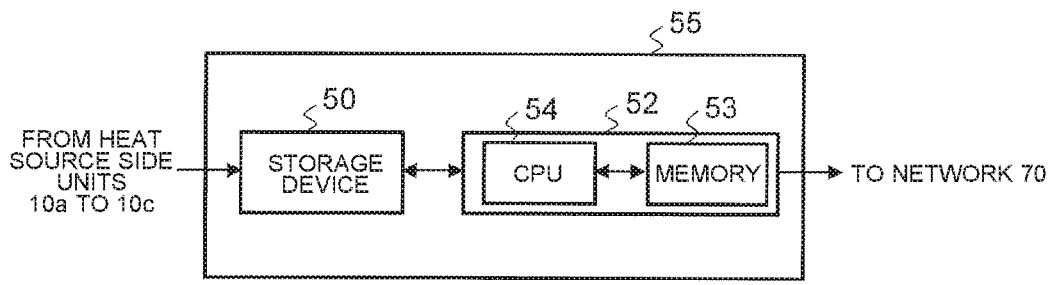
FIG. 12 is a block diagram illustrating an example of the configuration of a central controller illustrated in FIG. 11.

FIG. 12 is a block diagram illustrating an example of the configuration of the central controller illustrated in FIG. 11. The central controller 55 has the storage device 50 and a central control unit 52. The storage device 50 stores the feature values of the compressor 11 together with the device identifier of the compressor 11. The central control unit 52 has a memory 53, which stores programs, and a CPU 54, which executes processing in accordance with the programs. Note that FIG. 12 illustrates the storage device 50 such that the storage device 50 directly acquires information from the heat source side units 10a to 10c and stores the information therein; however, the central control unit 52 may acquire information from the heat source side units 10a to 10c and store the information in the storage device 50.

Figure 13:
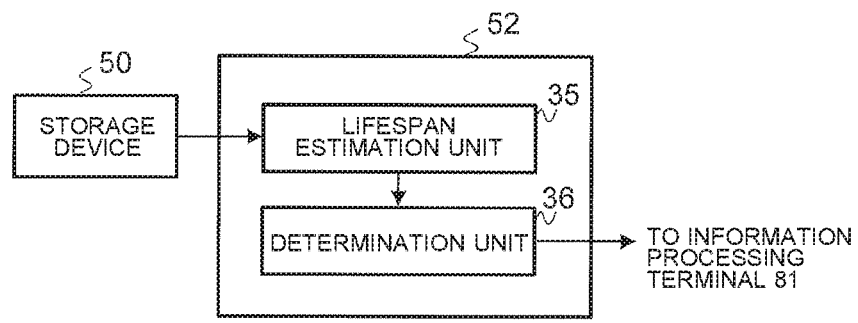
FIG. 13 is a functional block diagram illustrating an example of the configuration of a central control unit illustrated in FIG. 12.

FIG. 13 is a functional block diagram illustrating an example of the configuration of the central control unit illustrated in FIG. 12. The central control unit 52 has the lifespan estimation unit 35 and the determination unit 36. Through execution of programs using the CPU 54 illustrated in FIG. 13, the lifespan estimation unit 35 and the determination unit 36 are configured in the central controller 55.

Note that, for brevity, Embodiment 2 describes a case where the number of refrigeration cycle systems 1a connected to the network 70 is one; however, a plurality of refrigeration cycle systems 1a may be connected to the network 70.

Figure 14:
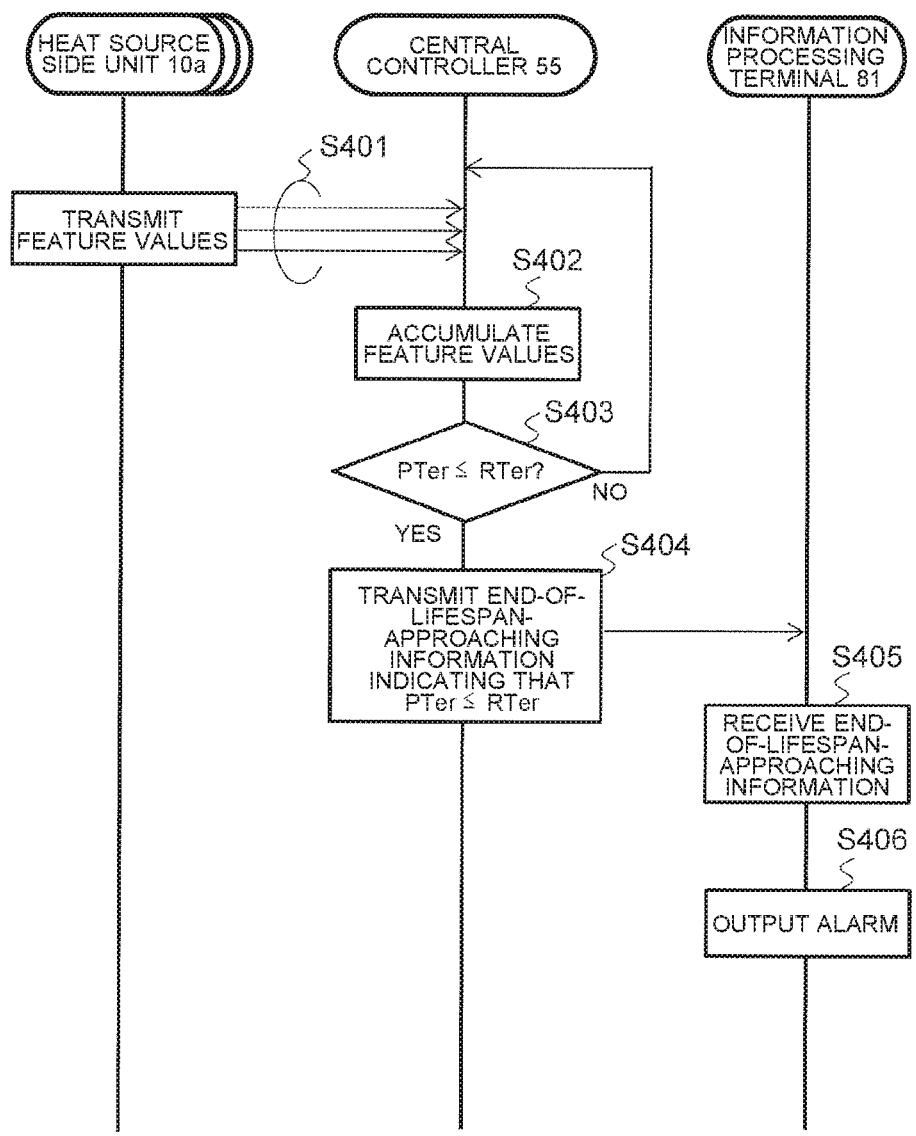
FIG. 14 is a sequence diagram illustrating an operating procedure for the device management system according to Embodiment 2 of the present disclosure.

Next, an operating procedure for a device management system 502 of Embodiment 2 will be described. FIG. 14 is a sequence diagram illustrating the operating procedure for the device management system according to Embodiment 2 of the present disclosure.

As described in step S101 illustrated in FIG. 4, when acquiring the feature values of the compressors 11, the heat source side units 10a to 10c transmit the device identifiers and the feature values to the central controller 55 (step S401). The central controller 55 stores, in the storage device 50, the feature values acquired from the heat source side units 10a to 10c in association with the device identifiers (step S402). The lifespan estimation unit 35 of the central controller 55 reads out feature values of the compressors 11, which are accumulated in the storage device 50, for the respective heat source side units 10a to 10c from the storage device 50, and estimates the lifespan of each compressor 11 similarly to as in step S103 illustrated in FIG. 4. Subsequently, similarly to as in step S104 illustrated in FIG. 4, the determination unit 36 performs lifespan determination for each compressor 11 on the basis of the lifespan estimated by the lifespan estimation unit 35 (step S403). As a result of the lifespan determination, in a case where there is no compressor 11 for which the remaining period PTer≤the scheduled period RTer, the determination unit 36 causes the process to return to step S401, and in a case where there is a compressor 11 for which the remaining period PTer≤the scheduled period RTer, the process proceeds to step S404.

In step S404, the determination unit 36 transmits, to the information processing terminal 81 via the network 70, end-of-lifespan-approaching information including the device identifier of the compressor 11 for which the remaining period PTer the scheduled period RTer (step S404).

When receiving the end-of-lifespan-approaching information from the central controller 55 (step S405), the information processing terminal 81 outputs an alarm (step S406). Output of an alarm is, for example, that the control unit of the information processing terminal 81 causes the display device 51 to display the end-of-lifespan-approaching information and user information specified by the device identifier. From the end-of-lifespan-approaching information and the user information displayed by the display device 51, a worker of the maintenance company 80 can identify which user's refrigeration cycle system 1*a* has a heat source side unit whose compressor 11 is close to the end of its lifespan.

Figure 15:
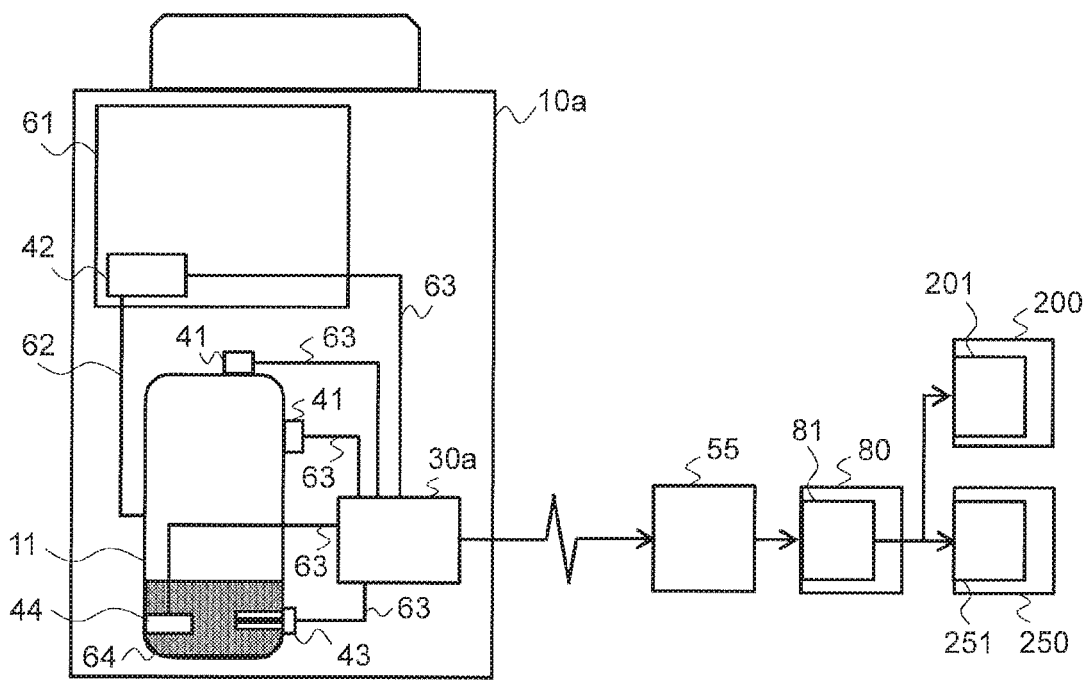
FIG. 15 is a diagram illustrating another example of a notification destination of end-of-lifespan-approaching information in the refrigeration cycle system according to Embodiment 2 of the present disclosure.

Note that Embodiment 2 describes the case where the central controller 55 reports the end-of-lifespan-approaching information to the information processing terminal 81 of the maintenance company 80; however, the notification destination of information regarding lifespan determination is not limited to the maintenance company 80. FIG. 15 is a diagram illustrating another example of the notification destination of the end-of-lifespan-approaching information in the refrigeration cycle system according to Embodiment 2 of the present disclosure.

Even in the configuration illustrated in FIG. 15, as described with reference to FIG. 9, one or more of the display device 51, the maintenance company 80, the warehouse 200, and the compressor manufacturer 250 may be set as the notification destination or destinations of the lifespan determination result depending on the purpose of use. As described with reference to FIG. 9, this allows each company to, for example, systematically manage the number of compressors in stock.

The refrigeration cycle system 1*a* of Embodiment 2 has the plurality of heat source side units 10*a* to 10*c* and the central controller 55 connected to the plurality of heat source side units 10*a* to 10*c*.

According to Embodiment 2, since the central controller 55 estimates the lifespan of each of the plurality of compressors 11 of the heat source side units 10*a* to 10*c*, the controller 30 of each heat source side unit does not need to perform lifespan estimation, and thus the information processing load for each unit is reduced.

In addition, in Embodiment 2, depending on the purpose of use, the central controller 55 may transmit the lifespan determination result to one or more of an indoor remote controller (not illustrated), the maintenance company 80, the warehouse 200, and the compressor manufacturer 250. The user can grasp the power consumption calculated from the lifespan determination result by the remote controller. A worker of the maintenance company 80 can quickly and systematically replace the compressor on the basis of the lifespan determination result. The administrator of the warehouse 200 can systematically reduce the number of replacement compressors in stock on the basis of the lifespan determination result. The person in charge at the compressor manufacturer 250 can arrange a compressor manufacturing plan on the basis of the lifespan determination result such that the number of compressors in stock before shipment is minimized.

Embodiment 3

Embodiment 3 is a case where a server connected to the heat source side units 10*a* to 10*c* described in Embodiment 1 via the network 70 has a data analysis function. In Embodiment 3, the configurations described in Embodiments 1 and 2 are denoted as the same reference numerals, and the detailed description thereof will be omitted.

Figure 16:
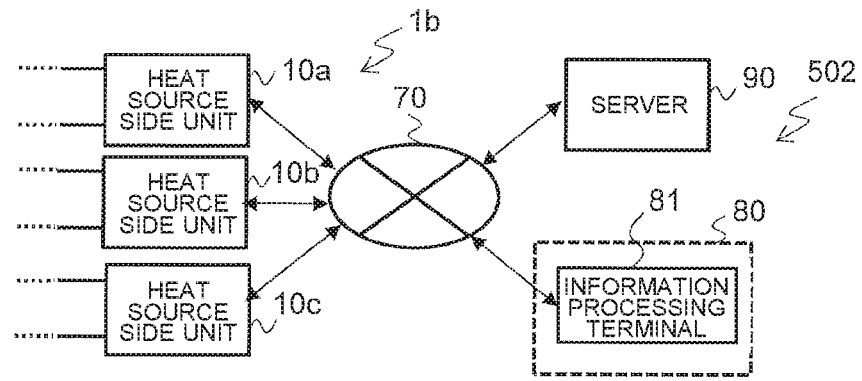
FIG. 16 is a diagram illustrating an example of the configuration of a device management system including a refrigeration cycle system according to Embodiment 3 of the present disclosure.

The configuration of a device management system including a refrigeration cycle system of Embodiment 3 will be described. FIG. 16 is a diagram illustrating an example of the configuration of the device management system including the refrigeration cycle system according to Embodiment 3 of the present disclosure. A device management system 502 has a refrigeration cycle system 1*b* including the plurality of heat source side units 10*a* to 10*c* described in Embodiment 2 and a server 90. The server 90 may be, for example, a server directly operated by the maintenance company 80 or a server operated by a cloud service providing company. The server 90 is a type of terminal connected to the network 70.

Figure 17:
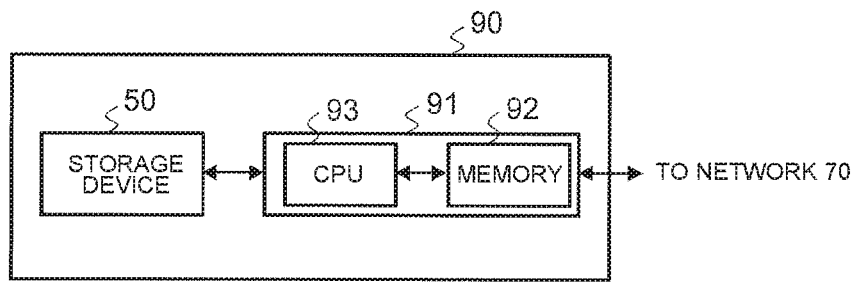
FIG. 17 is a block diagram illustrating an example of the configuration of a server illustrated in FIG. 16.

FIG. 17 is a block diagram illustrating an example of the configuration of the server illustrated in FIG. 16. The server 90 has the storage device 50 and a server control unit 91. The server control unit 91 has a memory 92, which stores programs, and a CPU 93, which executes processing in accordance with the programs.

Figure 18:
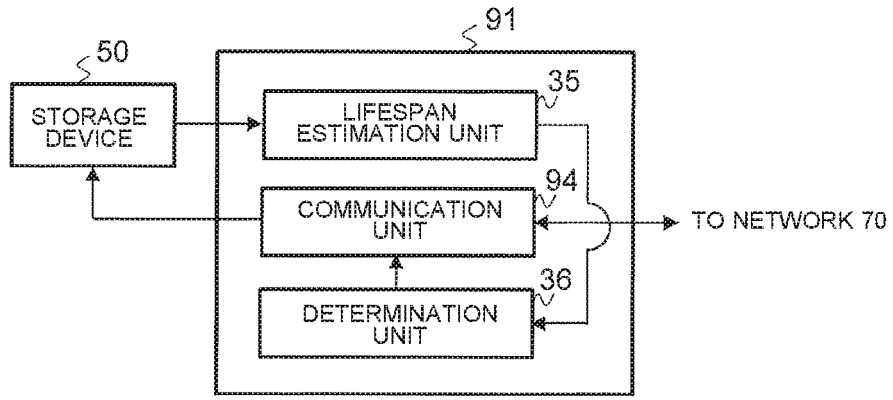
FIG. 18 is a functional block diagram illustrating an example of the configuration of a server control unit illustrated in FIG. 17.

FIG. 18 is a functional block diagram illustrating an example of the configuration of the server control unit illustrated in FIG. 17. The server control unit 91 has the communication unit 94, the lifespan estimation unit 35, and the determination unit 36. Through execution of programs using the CPU 93 illustrated in FIG. 17, the communication unit 94, the lifespan estimation unit 35, and the determination unit 36 are configured in the server 90. When receiving the feature values and the device identifiers of the compressors 11 from the heat source side units 10*a* to 10*c*, the communication unit 94 stores, in the storage device 50, the feature values in association with the device identifiers.

Figure 19:
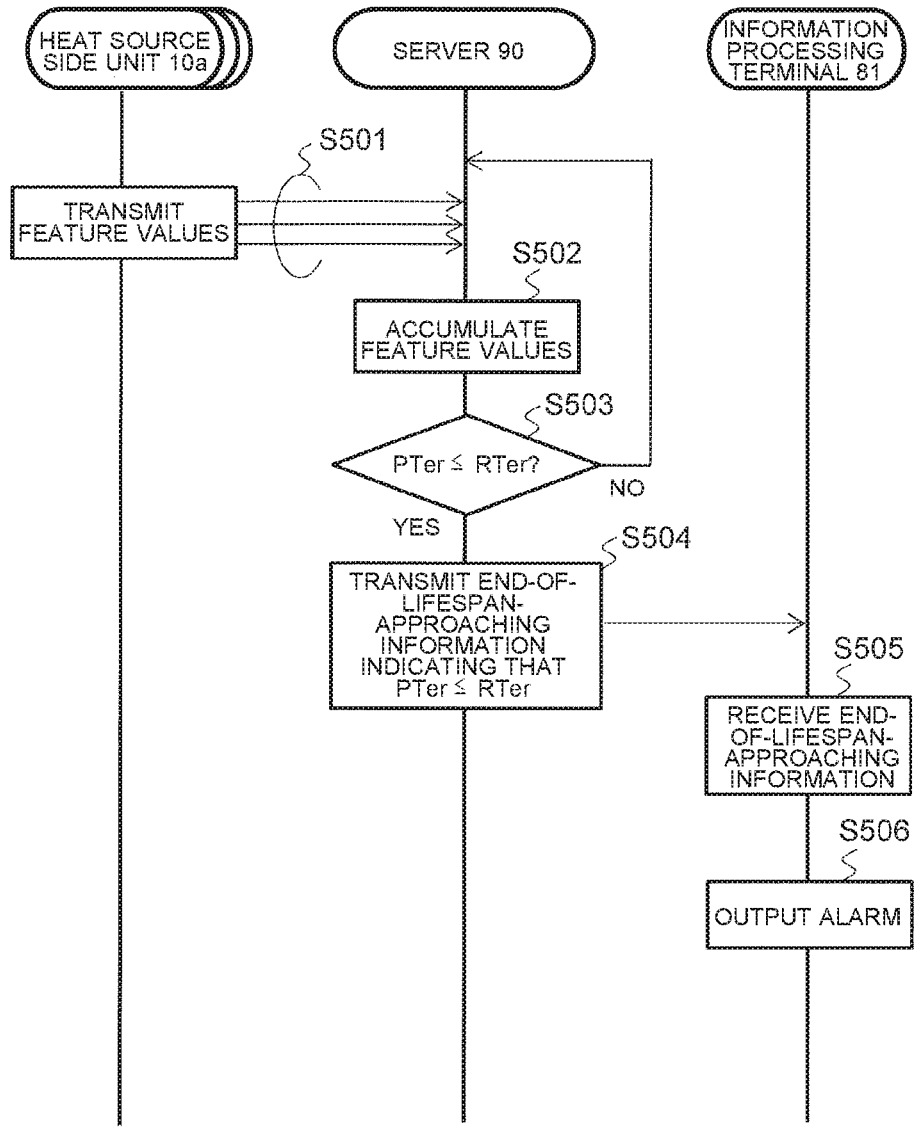
FIG. 19 is a sequence diagram illustrating an operating procedure for the device management system according to Embodiment 3 of the present disclosure.

Next, an operating procedure for the device management system 502 of Embodiment 3 will be described. FIG. 19 is a sequence diagram illustrating the operating procedure for the device management system according to Embodiment 3 of the present disclosure.

As described in step S101 illustrated in FIG. 4, when acquiring the feature values of the compressors 11, the heat source side units 10*a* to 10*c* transmit the device identifiers and the feature values to the server 90 via the network 70 (step S501). The communication unit 94 of the server 90 stores, in the storage device 50, the feature values acquired from the heat source side units 10*a* to 10*c* in association with the device identifiers (step S502). The lifespan estimation unit 35 of the server 90 reads out feature values of the compressors 11, which are accumulated in the storage device 50, for the respective heat source side units 10*a* to 10*c* from the storage device 50, and estimates the lifespan of each compressor 11 similarly to as in step S103 illustrated in FIG. 4. Subsequently, similarly to as in step S104 illustrated in FIG. 4, the determination unit 36 performs lifespan determination for each compressor 11 on the basis of the lifespan estimated by the lifespan estimation unit 35 (step S503). As a result of the lifespan determination, in a case where there is no compressor 11 for which the remaining period PTer≤the scheduled period RTer, the determination unit 36 causes the process to return to step S501, and in a case where there is a compressor 11 for which the remaining period PTer≤the scheduled period RTer, the process proceeds to step S504.

In step S504, the determination unit 36 transmits, to the information processing terminal 81 via the network 70, end-of-lifespan-approaching information including the device identifier of the compressor 11 for which the remaining period PTer≤the scheduled period RTer (step S504). When receiving the end-of-lifespan-approaching information from the server 90 (step S505), the information processing terminal 81 outputs an alarm (step S506), Output of an alarm is, for example, that the control unit of the information processing terminal 81 causes the display device 51 to display the end-of-lifespan-approaching information and user information specified by the device identifier. From the end-of-lifespan-approaching information and the user information displayed by the display device 51, a worker of the maintenance company 80 can identify which user's heat source side unit has a compressor 11 that is nearing the end of its lifespan.

Note that Embodiment 3 of the present disclosure describes the case where the refrigeration cycle system 1b reports the end-of-lifespan-approaching information to the information processing terminal 81 of the maintenance company 80 when the compressor 11 that is close to the end of its lifespan; however, a case where the end-of-lifespan-approaching information does not have to be reported to the maintenance company 80 will be described.

Figure 20:
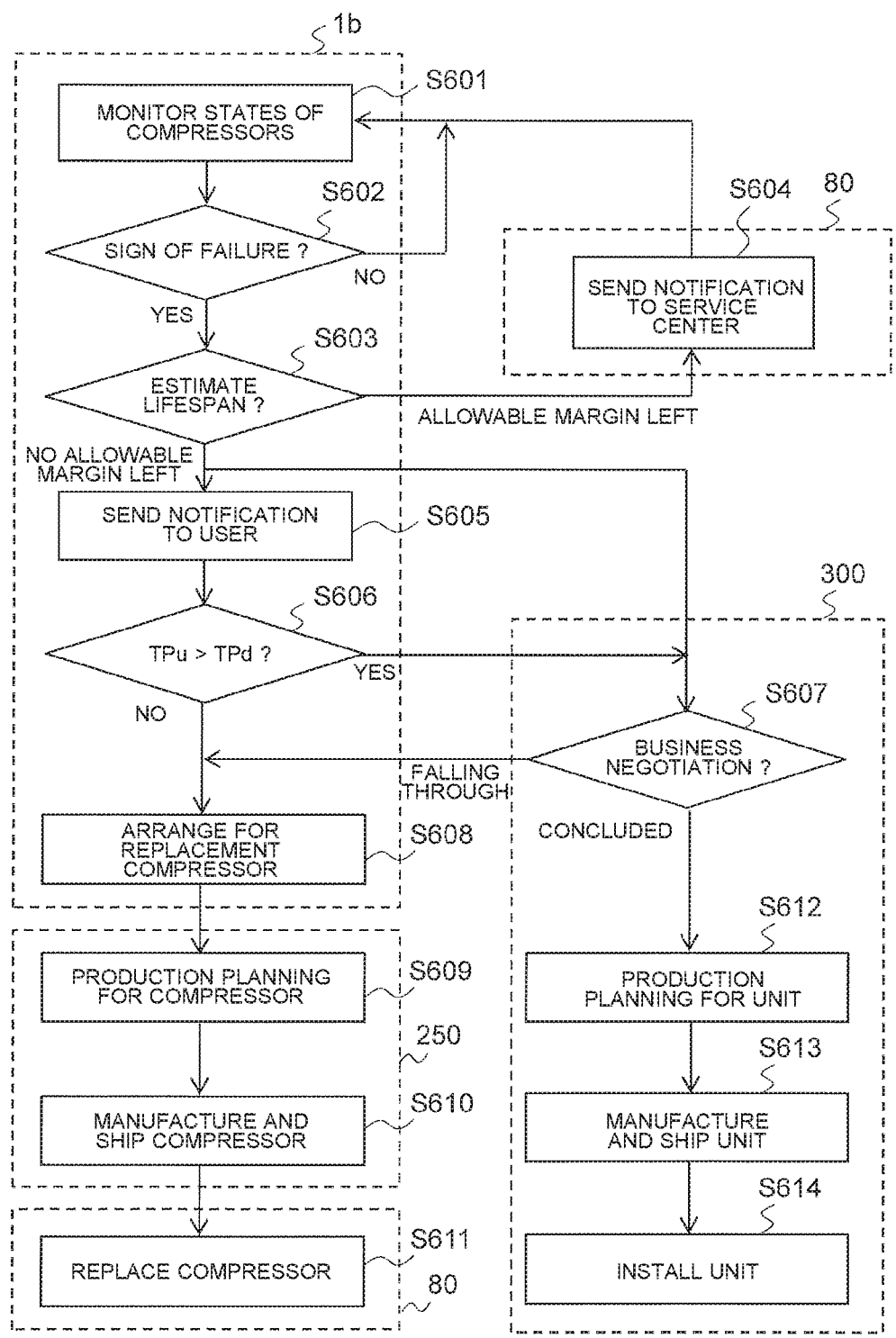
FIG. 20 is a diagram illustrating an example of a procedure performed by a maintenance company, a unit manufacturer, and a compressor manufacturer in accordance with operation of the device management system according to Embodiment 3 of the present disclosure.

FIG. 20 is a diagram illustrating an example of a procedure performed by a maintenance company, a unit manufacturer, and a compressor manufacturer in accordance with operation of the device management system according to Embodiment 3 of the present disclosure. A unit means a unit device including the compressor 11 and larger than the compressor 11. For example, the unit is the heat source side unit.

The server 90 of the refrigeration cycle system 1b monitors the states of the compressors 11 of the heat source side units 10a to 10c (step S601). In a case where the compressors 11 show no sign of failure (step S602), the server 90 causes the process to return to step S601, and in a case where any of the compressors 11 shows a sign of failure (step S602), the server 90 estimates the lifespan of the compressor 11 and determines whether there is an allowable margin left in the estimated lifespan (step S603). In a case where there is an allowable margin left, the server 90 reports information indicating to that effect to the information processing terminal 81 of the maintenance company 80 (step S604). In contrast, in a case where the determination in step S603 shows that there is no allowable margin left, the server 90 transmits end-of-lifespan-approaching information indicating that there is no allowable margin left to a remote controller (not illustrated) installed in the room and notify the user of the end-of-lifespan-approaching information (step S605), In that case, the server 90 also reports the information indicating to that effect to an information processing terminal (not illustrated) of a unit manufacturer 300.

The server 90 determines whether a usage period TPu of the unit including the compressor 11 exceeds a service lifespan TPd (step S606). The information processing terminal of the unit manufacturer 300 displays a display prompting a business negotiation when receiving one or both of the end-of-lifespan-approaching information on the compressor 11 and the information indicating that the usage period TPu of the unit exceeds the service lifespan TPd (step S607). Upon seeing the display prompting a business negotiation by the information processing terminal, a person in charge at the unit manufacturer 300 contacts the user to propose replacement of not only the compressor 11 but also the unit containing the compressor 11. In a case where the user does not accept replacement of the unit, the negotiation falls through. In this case, the server 90 transmits arrangement information indicating a request to make arrangements for a replacement compressor (step S608).

The information processing terminal 251 of the compressor manufacturer 250 displays the arrangement information received from the server 90. The person in charge at the compressor manufacturer 250 makes production planning for the compressor (step S609). A person in charge of manufacturing in the compressor manufacturer 250 manufactures the compressor in accordance with the production planning, and ships the manufactured compressor (step S610), A worker of the maintenance company 80 replaces the compressor installed at the user's site with a new compressor (step S611).

In contrast, in a case where the business negotiation is concluded in step S607, a person in charge at the unit manufacturer 300 makes the production planning for the unit (step S612). A person in charge of manufacturing in the unit manufacturer 300 manufactures the unit in accordance with the production planning, and ships the manufactured unit (step S613). A person in charge of installation in the unit manufacturer 300 replaces the unit installed at the user's site with a new unit (step S614).

Figure 21:
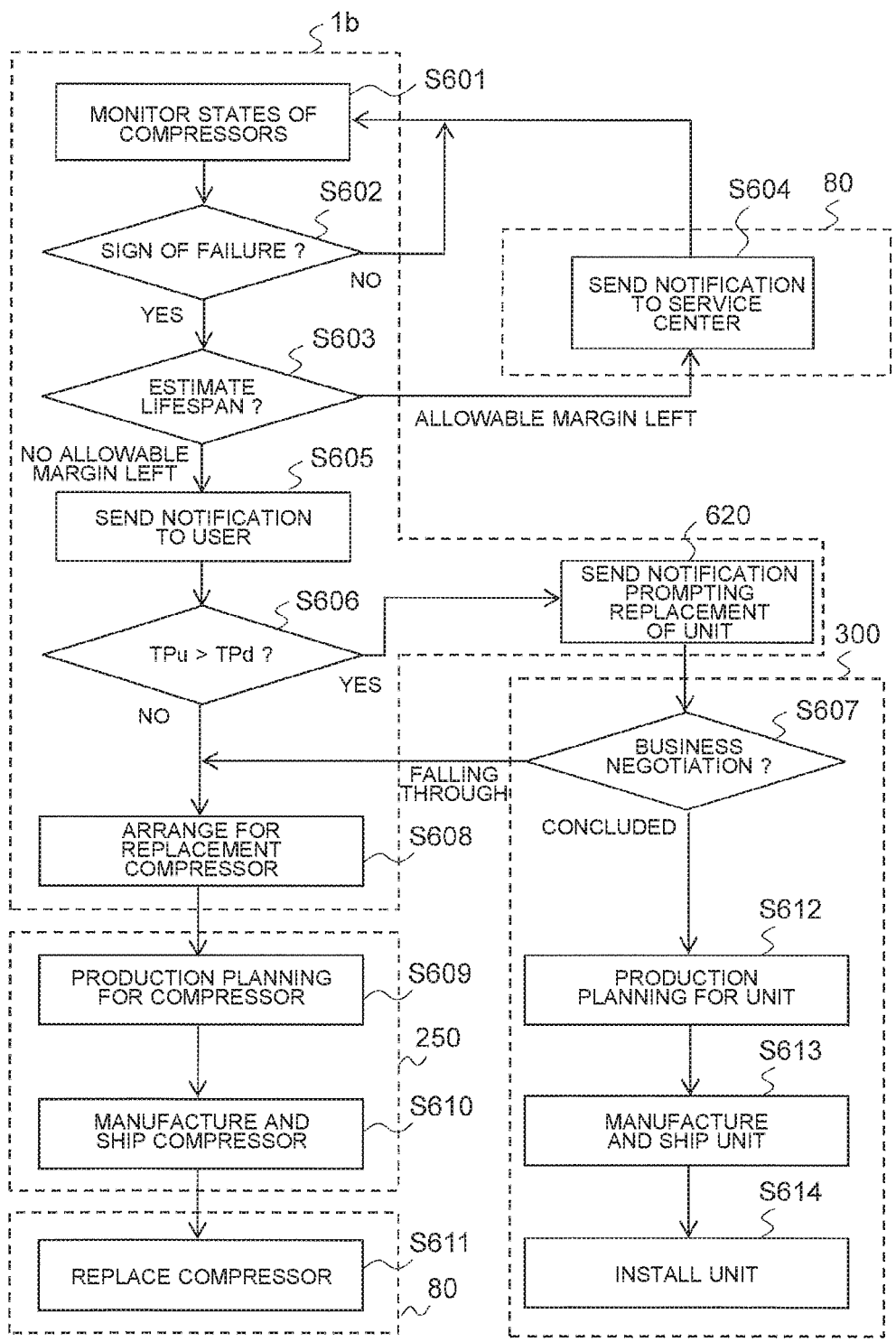
FIG. 21 is a diagram illustrating another example of the procedure performed by the maintenance company, the unit manufacturer, and the compressor manufacturer in accordance with operation of the device management system according to Embodiment 3 of the present disclosure.

FIG. 21 is a diagram illustrating another example of the procedure performed by the maintenance company, the unit manufacturer, and the compressor manufacturer in accordance with operation of the device management system according to Embodiment 3 of the present disclosure. In the procedure illustrated in FIG. 21, in step S606, in a case where the usage period TPu of the unit exceeds the service lifespan TPd, the server 90 sends a notification that prompts replacement of the unit to an information processing terminal of the unit manufacturer 300 (step S620). According to the procedures in FIGS. 20 and 21, not only can the compressor be systematically replaced before the compressor fails, but also the unit containing the compressor can be systematically replaced before the unit itself reaches the end of its lifespan.

Note that Embodiment 3 describes the case where the plurality of heat source side units 10a to 10c described in Embodiment 2 are connected to the network 70; however, the central controller 55 described in Embodiment 2 may be connected to the network 70. In this case, the central controller 55 does not need to be provided with the storage device 50 in the configuration illustrated in FIG. 12. In addition, it is sufficient that, instead of having the lifespan estimation unit 35 and the determination unit 36, the central control unit 52 illustrated in FIG. 12 have a function of transferring information received from the heat source side units 10a to 10c to the server 90. In addition, a plurality of central controllers 55 may be connected to the network 70. In this case, the server 90 can acquire feature values from a greater number of compressors 11, and the accuracy of estimation of the lifespan of each compressor 11 further improves.

The refrigeration cycle system 1b of Embodiment 3 has the plurality of heat source side units 10a to 10c and the server 90 connected to the plurality of heat source side units 10a to 10c via the network 70.

According to Embodiment 3, the server 90 accumulates feature values from many compressors 11 in the storage device 50, thereby making it possible to generate, for each type of compressor 11, a database of the relationship between the feature values and the exchange cycle. As a result, the accuracy of the scheduled period to be set for each type of compressor 11 improves, and the number of times compressor replacement is performed due to occurrence of an abnormality can be made close to zero. In addition, a worker of the maintenance company can also use the vast amount of operation data converted into a database to analyze the cause of an abnormality for each type of compressor 11.

In addition, in Embodiment 3, the server 90 may also transmit the end-of-lifespan-approaching information to both the remote controller (not illustrated) installed in the room and an information processing terminal of the unit manufacturer 300 including the compressor 11. In this case, in a case where the usage period TPu of the unit exceeds the service lifespan TPd, the unit manufacturer 300 can make a proposal to the user to replace not the compressor alone but the unit. As a result, the unit manufacturer 300 can efficiently and effectively make a proposal to the user to update the currently used unit to a new unit.

REFERENCE SIGNS LIST 1, 1a, 1b refrigeration cycle system 10, 10a to 10c heat source side unit compressor 12 four-way valve 13 heat source side heat exchanger 14 feature value detection unit 20 load side unit 21 expansion device 22 load side heat exchanger 23 room temperature sensor 24 fan 30, 30a controller memory 32 CPU 33 refrigeration cycle control unit 34 communication unit 35 lifespan estimation unit 36 determination unit 40 refrigerant circuit vibration meter 42 electric current sensor 43 capacitance sensor 44 photometric sensor 50 storage device 51 display device 52 central control unit 53 memory 54 CPU 55 central controller 61 motor controller 62 power line 63 signal line 64 refrigerating machine oil 70 network 80 maintenance company 81 information processing terminal 90 server 91 server control unit 92 memory 93 CPU 94 communication unit 200 warehouse 201 information processing terminal 250 compressor manufacturer 251 information processing terminal 300 unit manufacturer 501, 502 device management system

The invention claimed is:

1. A device management system comprising:
a plurality of devices each having a structural component;
a central controller connected to the plurality of devices via a network;
a feature value detection unit provided in each of the plurality of devices and configured to detect a feature value of the structural component;
a first information processing terminal of a maintenance company of the devices that is connected to the central controller via the network; and
a second information processing terminal of a manufacturer of the structural component of each of the plurality of devices that is connected to the central controller via the network, wherein
the central controller includes
a storage device storing in time series the feature value detected by each of the feature value detection units;
wherein the central controller:
estimates a lifespan of the structural component of each of the plurality of devices from the feature value stored in the storage device;
determines whether a remaining period that is a time period from a time at which estimation is performed to an end of the lifespan is less than or equal to a set scheduled period; and if the remaining period is less than or equal to the set schedule period, reports the determination result to the first information processing terminal and the second information processing terminal, and wherein the first information processing terminal sends a notification indicating that the remaining period is less than or equal to the set scheduled period.

2. The device management system of claim 1, wherein each of the plurality of devices notifies a user of a determination result in a case where the central controller determines that the remaining period is less than or equal to the set scheduled period.

3. The device management system of claim 1, wherein in a case where the second information processing terminal receives a notification of the determination result, the second information processing terminal updates information on production planning for the structural component in accordance with the received determination result.

4. The device management system of claim 3, wherein the second information processing terminal reports the updated information on the production planning to the first information processing terminal.

5. The device management system of claim 3, wherein, after updating the information on the production planning, the second information processing terminal transmits the updated information on the production planning to the plurality of devices.

6. The device management system of claim 1, wherein the central controller estimates the lifespan by performing absolute evaluation in which the feature value stored in the storage device is compared with a set threshold.

7. The device management system of claim 1, wherein the central controller estimates the lifespan by performing relative evaluation using a plurality of feature values stored in time series in the storage device.

8. The device management system of claim 1, wherein in a case where the device is a heat source side unit of a refrigeration cycle system, the feature value detection unit is at least one or both of vibration meters that detect vibration of a compressor included in the heat source side unit, and an electric current sensor that detects a current fed back to a motor of the compressor as the feature value.

9. The device management system of claim 1, wherein in a case where the feature value is the state of the refrigerating machine oil of the compressor, the feature value detection unit is at least one or both of a capacitance sensor that detects the capacitance of the refrigerating machine oil, and a photometric sensor that detects a light transmittance of the refrigerating machine oil.

10. The device management system of claim 8, wherein the refrigeration cycle system performs operation data acquisition operation in which a rotation speed of the compressor is controlled in accordance with a set operation data acquisition condition to circulate refrigerant in a refrigerant circuit,
acquires the feature value from the feature value detection unit during the operation data acquisition operation and stores the feature value in the storage device.

11. The device management system of claim 4, wherein the first information processing terminal generates a maintenance schedule in accordance with the updated production planning and notifies the user of the production planning and the maintenance schedule.

* * * * *